United States Patent

[11] 3,569,740

[72] Inventor Jack Avins
Princeton, N.J.
[21] Appl. No. 604,977
[22] Filed Dec. 27, 1966
[45] Patented Mar. 9, 1971
[73] Assignee RCA Corporation

[54] SIGNAL TRANSLATING SYSTEM PROVIDING AMPLIFICATION AND LIMITING
11 Claims, 6 Drawing Figs.

[52] U.S. Cl. 307/237, 307/296, 307/303, 330/20, 330/30
[51] Int. Cl. H03k 5/08
[50] Field of Search 307/237, 213, 215, 303; 330/30, 20

[56] References Cited

UNITED STATES PATENTS

| | | | |
|---|---|---|---|
| 3,441,749 | 4/1968 | Rasiel et al. | 330/30 |
| 3,444,476 | 5/1969 | Leidich | 330/30 |
| 3,469,195 | 9/1969 | Harwood | 330/30 |
| 2,845,583 | 7/1958 | Reuther et al. | 307/215X |
| 3,098,936 | 7/1963 | Isabeau | 307/237 |
| 3,137,826 | 6/1964 | Boudvias | 330/20X |
| 3,182,268 | 5/1965 | Burwen | 330/20X |
| 3,259,761 | 7/1966 | Narud et al. | 307/215 |
| 3,396,282 | 8/1968 | Sheng et al. | 307/215 |

OTHER REFERENCES

Millman & Taub, Pulse, Digital & Switching Waveforms, 1965 Pages 242—246

Design of Transistorized circuits for Digital Computers, by Abraham I. Pressman, 1960. Pages 10—268, 10—270, 10—271

*Primary Examiner*—Stanley D. Miller, Jr.
*Attorney*—Eugene M. Whitacre

ABSTRACT: A limiter-amplifier circuit including first and second emitter coupled transistors and an emitter follower (third) transistor having its input direct coupled to the output (collector) of the second transistor. The first transistor is operated as a base input, common collector stage while the second transistor is operated as an emitter input, common base stage. A resistor connected in common to the emitters of the first and second transistors is substantially one-half the value of a resistor connected to the collector of the second transistor. Output load resistance is coupled to the emitter of the emitter follower transistor and an additional resistor is coupled to the collector of the emitter follower to provide substantially symmetrical limiting of input signals supplied to the base of the first transistor.

Inventor:
JACK AVINS
Eugene M. Whitaker
Attorney

Inventor:
JACK AVINS
Eugene M. Whitacre
Attorney

SIGNAL TRANSLATING SYSTEM PROVIDING AMPLIFICATION AND LIMITING

This invention relates to signal translating systems and, more particularly, to amplifier-limiters which can be economically fabricated using integrated circuit techniques.

As used herein, the term integrated circuit refers to a unitary or monolithic semiconductor device which is the equivalent of a network of interconnected active and passive circuit elements. Various problems have presented themselves in the design of amplifier circuits to be formed in an integrated circuit device. For example, in cascade connected resistance-capacitance amplifiers the use of coupling capacitors between successive stages is objectionable in some applications. For one thing, the coupling capacitor occupies considerable area on the integrated circuit device, even for a relatively small amount of capacitance. The small coupling capacitance limits not only the low frequency response of the amplifier, but also the high frequency response and, therefore, the gain at the desired signal frequency; and the parasitic shunt capacitance which occurs in integrated circuit capacitor structures limits the high frequency response still further. In addition to the foregoing, limitations in the processing techniques presently used for forming capacitors are such that the resultant capacitors may be a substantial source of trouble due to shorting between the plates thereof.

In cascade connected direct coupled amplifiers, the direct voltage appearing at the output electrode of one stage comprises the voltage which is applied to the succeeding stage. As a result, complicated biasing networks are used to establish the desired operating point for each of the cascaded stages. In addition, direct current (DC) feedback must be provided for operating point stabilization. Where substantial gain is to be effected in a single integrated circuit device, the phase shifts within the feedback loop are such as to increase the likelihood of circuit instability.

An amplifier stage embodying the invention includes three transistors. A first and second of the transistors are connected as an emitter coupled amplifier with the first transistor operating in the base-input, common-collector mode, and with the second transistor operating in the emitter-input, common-base, collector-output mode. The third transistor, connected as an emitter follower, is directly coupled to receive the signals developed at the collector electrode of the second transistor.

In accordance with an embodiment of the invention, a resistor connected in common to the emitter electrodes of the first and second transistors is substantially one-half the value of a load resistor connected to the collector electrode of the second transistor. The proportioning of the resistors in this manner provided stabilization of the output voltage in the presence of temperature changes or supply voltage variations. In addition, a resistor is connected to the collector electrode of the third transistor to ensure symmetrical limiting of input signals applied to the base electrode of the first transistor.

As will become clear hereinafter, such an amplifier stage is similar to one described in my U.S. Pat. No. 3,366,889 entitled "INTEGRATED ELECTRICAL CIRCUIT" granted Jan. 30, 1968 on Ser. No. 396,140, filed Sept. 14, 1964. Several such stages can also be cascaded in a manner analogous to that described therein, to form the sound channel for a television receiver, for example.

The novel features which are considered to be characteristic of this invention are set forth with particularity in the claims. The invention itself, however, both as to its organization and method of operation as well as objects and advantages thereof, will best be understood from the following description when read in connection with the accompanying drawings in which:

Figure 1:
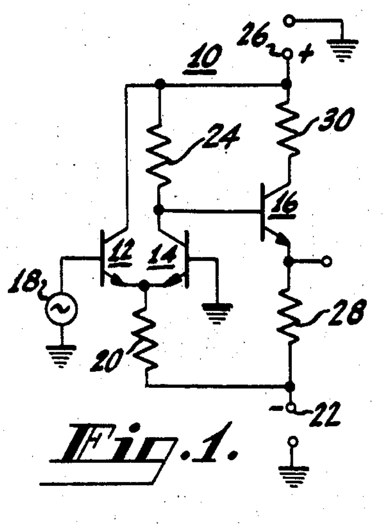
FIG. 1 is a schematic circuit diagram of an amplifier stage embodying the invention.

Referring now to FIG. 1, the schematic circuit diagram there shown represents a direct current coupled amplifier stage 10 which may comprise a basic building block for integrated circuits. The amplifier stage 10 includes three transistors 12, 14 and 16 connected to provide an emitter coupled amplifier circuit driving an emitter follower circuit.

The emitter coupled amplifier circuit includes the transistor 12 connected in the common collector configuration, driving the transistor 14 which is connected in the common-base configuration. Signals from a source 18, not necessarily included in the integrated circuit device, are applied to the base electrode of the transistor 12. Coupling between the transistors 12 and 14 is effected by the direct emitter connection and the resistor 20, which is connected in common between the emitter electrodes of the transistors 12 and 14 and the negative terminal 22 of an operating potential supply. The base electrode of transistor 14 is connected to a point of reference potential, such as ground. A load resistor 24 is connected between the collector electrode of transistor 14 and a positive terminal 26 of the operating potential supply. Amplified signals developed across the load resistor 24 are directly applied to the base electrode of the transistor 16, which is connected in an emitter follower circuit. Output signals from the stage 10 are developed across the emitter follower load resistor 28. Another resistor 30 is connected between the collector electrode of transistor 16 and the positive terminal 26.

The operating potential supply source, not shown, comprises a three terminal supply providing symmetrical positive and negative voltages relative to ground. By way of example, the voltages at the terminals 26 and 22 may be plus 2.0 volts and minus 2.0 volts respectively, with ground as a reference.

In the present example, the emitter coupled amplifier circuit is balanced for symmetrical operation by maintaining the base electrodes of transistors 12 and 14 at substantially the same (ground) potential. Further amplifier stages of the same circuit configuration as the amplifier stage 10 can be directly driven by that stage if the DC voltage at the emitter electrode of transistor 16 is held at ground potential. In such a case, the emitter coupled amplifier of succeeding stages will be balanced since the base electrodes of the first transistor thereof will be at DC ground potential.

As so far described, the amplifier stage 10 of FIG. 1 is very similar to that described in U.S. Pat. No. 3,366,889. In the manner set forth therein, it can be shown that the amplifier stage of this application as well as of that Patent can be stabilized against temperature changes and power supply variations by selecting the resistor 24 to be twice as large as the resistor 20. A comparison of the two amplifier stages will show that the amplifier stage of this application includes a resistor 30 in the collector circuit of the emitter follower transistor 14 which is not shown in the U.S. Pat. No. 3,366,889. The advantages that accrue from the inclusion of this resistor 30 will become clear from the following description.

Figure 2:
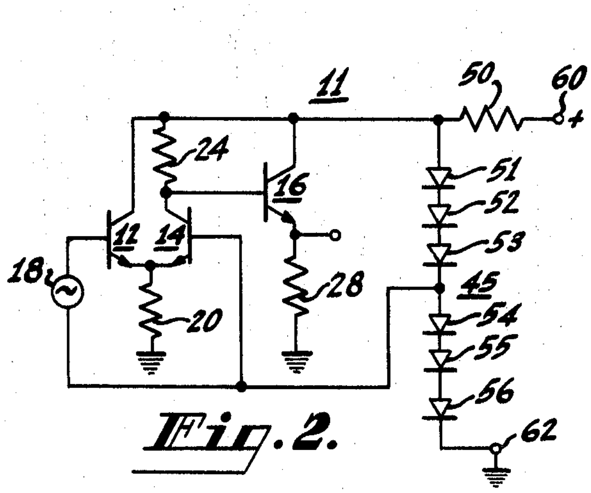
FIG. 2 is a schematic circuit diagram of an operating potential supply-amplifier combination of the Ser. No. 396,140 application which is helpful in understanding the present invention.

Referring now to FIG. 2, there is shown a schematic circuit diagram of the amplifier stage 11 of the above-mentioned patent in combination with an unbalanced operating potential supply 45. In other words, all of the voltages in the circuit are positive relative to ground. Corresponding numbers are used to designate similar components in FIGS. 1 and 2, and also in FIGS. 3–5 to be later described.

In FIG. 2, a resistor 50 and six rectifiers 51, 52, 53, 54, 55 and 56, all formed on the integrated circuit chip, are connected in series between the positive and negative terminals of a DC supply source 60, 62 which may be subject to some voltage variation. The rectifiers 51–56 are poled to be forward biased by the supply source and provide a substantially constant voltage drop for relatively wide fluctuations of supply voltage. The full voltage developed across the six rectifiers provides the collector voltage for the transistors 12, 14, and 16 and the voltage developed across the rectifiers 54–56 is used to provide the base voltage for the transistors 12 and 14.

Since the voltage drop per rectifier is about 0.7 volts, about 4.2 volts is used as the collector voltage supply while about 2.1 volts is applied between the base electrodes of transistors 12 and 14 and ground. By operating the base electrodes of transistors 12 and 14 at one-half the collector supply voltage and by selecting the value of the common-emitter resistor 20 to be one-half that of the collector load resistor 24, the voltage drops across these resistors can be made equal.

The DC voltage level established at the connected emitter electrodes of the transistors 12 and 14 under quiescent conditions is less than that at the base electrode of transistor 14 by an amount equal to the voltage drop ($V_{be}$) across the base-to-emitter junction of that transistor. Since this $V_{be}$ drop is also about 0.7 volts, the voltage at the emitter electrodes approximates 1.4 volts with respect to ground. The voltage drop across resistor 20, and therefore across resistor 24, is thus 1.4 volts, thereby establishing the collector electrode of transistor 14 at 2.8 volts above ground. The voltage at the emitter electrode of transistor 16 being one $V_{be}$ or 0.7 volts less than the transistor 14 collector electrode voltage (the drop across the base-emitter junction of transistor 16), its quiescent value is 2.1 volts referenced to ground. With the input base electrode of transistor 12 and the output emitter electrode of transistor 16 at the same quiescent voltage, it will be noted that succeeding amplifier stages can then be directly connected in cascade without the necessity for complicated biasing networks.

One feature of the amplifier-potential supply combination of FIG. 2 is that it provides symmetrical limiting of signals applied to the base electrode of transistor 12. As the signals supplied by the source 18 increase in amplitude (go more positive), transistor 12 becomes more conductive. Transistor 14 becomes correspondingly less conductive and eventually an input signal amplitude is reached at which point it will become cut off. The collector electrode of transistor 14 at cutoff rises to 4.2 volts, an increase of 1.4 volts from its quiescent state. As the signals supplied from the source 18 decrease in amplitude (go less positive), the converse is true. That is, transistor 12 becomes less conductive while the conductivity of transistor 14 increases. The voltage at the collector electrode of transistor 14 then decreases while that at the emitter electrode thereof increases, until a signal amplitude is reached at which point the current flowing through transistor 14 attains its maximum value and the transistor becomes saturated. The collector electrode of transistor 14, at this point, falls to the same voltage as at the emitter electrode, 1.4 volts (the base voltage minus the $V_{be}$ drop), a decrease of approximately 1.4 volts from its quiescent value. It will thus be appreciated that strong input signals applied to the base electrode of transistor 12 cause the signal developed at the collector electrode of transistor 14 to swing substantially equal amounts to reach its positive peak as to reach its negative peak. When this symmetrically limited signal is coupled via the emitter follower output transistor 16 to a frequency modulated (FM) discriminator, for example, any amplitude distortion present in the input signal will have been virtually eliminated. Distortion and noise free discriminator performance are then possible.

Figure 3:
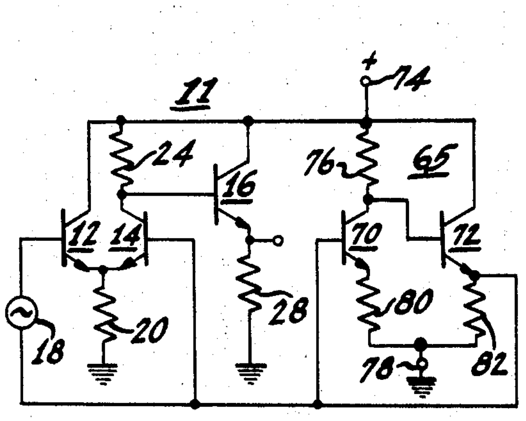
FIG. 3 is a schematic circuit diagram of another operating potential supply-amplifier combination helpful in understanding the present invention.

Referring now to FIG. 3, there is shown a schematic circuit diagram of the amplifier stage of U.S. Pat. No. 3,366,889 in combination with an operating potential supply described in U.S. Pat. No. 3,383,612, entitled "INTEGRATED CIRCUIT BIASING ARRANGEMENT," granted May 14, 1968 on an application, Ser. No. 510,307, filed Nov. 29, 1965. That potential supply (to be described below) is similar to the rectifier supply of FIG. 2 in that it also develops a bias voltage for the base electrodes of transistors 12 and 14 which is one-half the value of the collector supply voltage. The bias voltage in both cases, in addition, is maintained at this fractional value in the presence of temperature variations and supply voltage variations (at potential terminal 62 in FIG. 2, for example). The operating potential supply of that Pat. No. 3,383,612 differs from the rectifier supply, however, in that the value of bias voltage it develops is additionally maintained constant in the presence of temperature variations. It will be noted that temperature variations change the $V_{be}$ voltage drops of the individual rectifiers in FIG. 2 and, thus, the bias voltage developed across the units 54–56.

Referring now more particularly to FIG. 3, the operating potential supply 65 there shown includes a pair of transistors 70 and 72. One transistor 70 is arranged in a degenerated common-emitter type configuration, with its collector electrode connected to an energizing potential terminal 74 through a first resistor 76 and with its emitter electrode connected to a reference potential terminal 78 through a second resistor 80. The other transistor 72 is arranged in a common-collector type configuration, with its collector electrode directly connected to the energizing potential terminal 74 and with its emitter electrode connected to the reference terminal 78 through a third resistor 82. The emitter electrode of transistor 72 is also connected to the base electrode of transistor 70 and to the base electrode of transistor 14, included in the amplifier stage 10, while the collector electrode of transistor 70 is additionally connected to the base electrode of transistor 72. Potential terminal 74 and reference terminal 78 are adapted to be connected to a source of energizing potential of proper polarity (not shown), with terminal 74 also being connected to provide the collector supply voltage for each of the amplifier stage transistors 12, 14, and 16. By way of example, terminals 74 and 78 may be connected to a plus 7.0 volt source and to ground respectively, while resistor 76 is selected to be of substantially the same resistance value as resistor 80. With resistors 76 and 80 proportioned in this manner, a DC voltage of 3.5 volts, one-half the voltage at the end of resistor 76 remote from transistor 70, is developed at the emitter electrode of transistor 72.

The DC voltage level established at the connected emitter electrodes of the transistors 12 and 14 under quiescent conditions in this case is 2.8 volts, the 3.5 volts developed by the supply 65 less the 0.7 volts $V_{be}$ drop of transistor 14. The voltage drop across resistor 20, and therefore across resistor 24 as previously described, is thus 2.8 volts, thereby establishing the collector electrode of transistor 14 at 7.0 less 2.8 volts or 4.2 volts above ground. The voltage at the emitter electrode of transistor 16 being one $V_{be}$ or 0.7 volts less than this collector electrode voltage, its quiescent value is 3.5 volts relative to ground. It will be noted that here, as in FIG. 2, the input base electrode of transistor 12 and the output emitter electrode of transistor 16 are at the same quiescent voltage, simplifying the cascading of succeeding amplifier stages.

The amplifier-voltage supply combination of FIG. 3, however, may be unable to provide symmetrical limiting of signals applied to the base electrode of transistor 12. To be more specific, as the signals supplied by source 18 increase in amplitude (go more positive), a point will eventually be reached at which transistor 14 will become cut off. The collector electrode of transistor 14 will then have risen to a 7.0 volt level, an increase of 2.8 volts from its quiescent state. As the signals supplied from the source 18 decrease in amplitude (go less positive), a point will eventually be reached at which transistor 14 will become saturated. Since the collector electrode of transistor 14 falls to the same voltage as at the emitter electrode at this point, 2.8 volts (the 3.5 volt base level less the $V_{be}$ drop), and cannot fall any lower, it will be apparent that the collector electrode will then have decreased 1.4 volts from its quiescent value. In other words, with the arrangement shown in FIG. 3, signals at the collector electrode of transistor 14 will swing a greater amount in the positive direction (2.8 volts) than in the negative direction (1.4 volts). This asymmetrical limiting of input signals applied to the amplifier stage 11 causes a shift in the clipping axis of the amplifier and thereby degrades its performance. As a result, distortion and noise may be introduced into the output signal developed by a following FM discriminator which operates in response to the collector electrode signals coupled through the emitter-follower transistor 16. It can be shown, furthermore, that these direct effects of asymmetrical limiting generally obtain whenever the amplifier stage 11 of FIG. 3 operates with collector and base supply voltages other than the 4.2 volts and 2.1 volts respectively described above with reference to the combination of FIG. 2.

Figure 4:
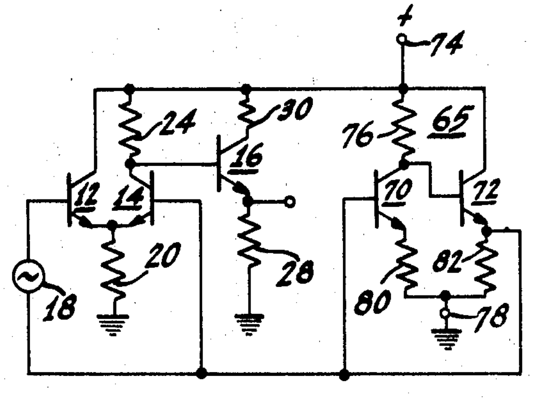
FIG. 4 is a schematic circuit diagram of an amplifier stage embodying the invention in combination with the operating potential supply of FIG. 3.

Referring now to FIG. 4, there is shown a schematic circuit diagram of the amplifier stage 10 embodying the present invention in combination with the operating supply 65 of FIG. 3, i.e. with a source which supplies collector and base voltages other than 4.2 and 2.1 volts, respectively. As was the case with the FIG. 3 arrangement, the quiescent voltages at the base and collector electrodes of transistor 14 are 3.5 volts and 4.2 volts, respectively. With this arrangement, however, input signals supplied to the stage 10 will be symmetrically limited and distortion and noise free discriminator performance will result.

Consider, first, the case where the signals supplied from the source 18 decrease in amplitude (go less positive). As before, an amplitude will eventually be reached at which transistor 14 saturates and its collector electrode falls to 2.8 volts above ground, the quiescent voltage at the emitter electrode. The decrease in collector voltage from its quiescent state is again 1.4 volts, and the situation is the same as that which existed with the combination of FIG. 3.

Consider, next, the case where the signals supplied from the source 18 increase in amplitude (go more positive). Once again, an amplitude will eventually be reached at which transistor 14 cuts off. However, whereas the collector electrode of transistor 14 was previously able to swing positive to the 7.0 volt level at terminal 74, now it is prevented from reaching that level because of the presence of resistor 30 in the collector electrode circuit of transistor 16. More specifically, as the collector electrode of transistor 14 swings more positively than plus 4.2 volts, the voltage drop across resistor 30 increases and the voltage at the collector electrode of transistor 16 decreases. Resistor 30 is set at a value such that transistor 16 saturates when the swing at the collector electrode of transistor 14 reaches plus 5.6 volts. The base-collector junction of transistor 16 is then forward biased and the voltage at the collector electrode of transistor 14 is clamped to that at the collector electrode of transistor 16 less a one $V_{be}$ drop. Resistor 28 is selected with respect to resistor 30 such that the voltage at the collector electrode of transistor 14 is clamped to that 5.6 volt level. This action, in addition, limits any further positive swing at the collector electrode of transistor 14 to that 5.6 level, or to a level which is 1.4 volts removed from the quiescent 4.2-volt value. It will be noted that with this arrangement, the signal developed at the collector electrode of transistor 14 will be symmetrically limited. That is, the signal will be constrained to swing no more positive than 1.4 volts from its quiescent 4.2 volt level before limiting occurs, just as it will be constrained to swing no more negative than 1.4 volts from that level, as previously described.

It will be appreciated that similar clipping action for positive signal excursions at the collector electrode of transistor 14 can be had with a properly poled diode in place of resistor 30, or with a combination of one or more diodes and series resistance. The same action can also be had with a diode clipper connected to the collector electrode of transistor 14. These latter arrangements, however, are more complex than that shown in FIG. 4, which has been found to operate particularly well with both regulated and unregulated operating supplies.

It will also be appreciated that this heretofore problem of unsymmetrical limiting arises because the quiescent voltage established at the collector electrode of transistor 14 is different from one-half the sum of the collector supply potential and the quiescent voltage established at the emitter electrode of transistor 14. The collector electrode of transistor 14 can then swing a greater amount in one direction, at transistor 14 cutoff for example, than it can in the opposite direction, at transistor 14 saturation. Consider the amplifier circuit 11 of FIG. 2, where the quiescent voltage at the collector electrode of transistor 14 is 2.8 volts. This voltage is one-half the sum of the 4.2-volt rectifier supply potential and the 1.4-volt quiescent level at the emitter electrode of transistor 14. As was previously described, the circuit 11 symmetrically limits. Consider, on the other hand, the amplifier circuit 11 of FIG. 3, where the quiescent voltage at the collector electrode of transistor 14 is 4.2 volts. This voltage is less than one-half the sum of the 7.0-volt potential applied to terminal 74 and the 2.8-volt quiescent level at the emitter electrode of transistor 14. As was also noted, circuit 11 does not symmetrically limit in this instance. However, by using an additional resistor 30 in the manner described with respect to FIG. 4, symmetrical limiting can be had with the arrangement of FIG. 3 even though the one-half quiescent voltage relationship at the collector electrode of transistor 14 is not maintained.

Figure 5:
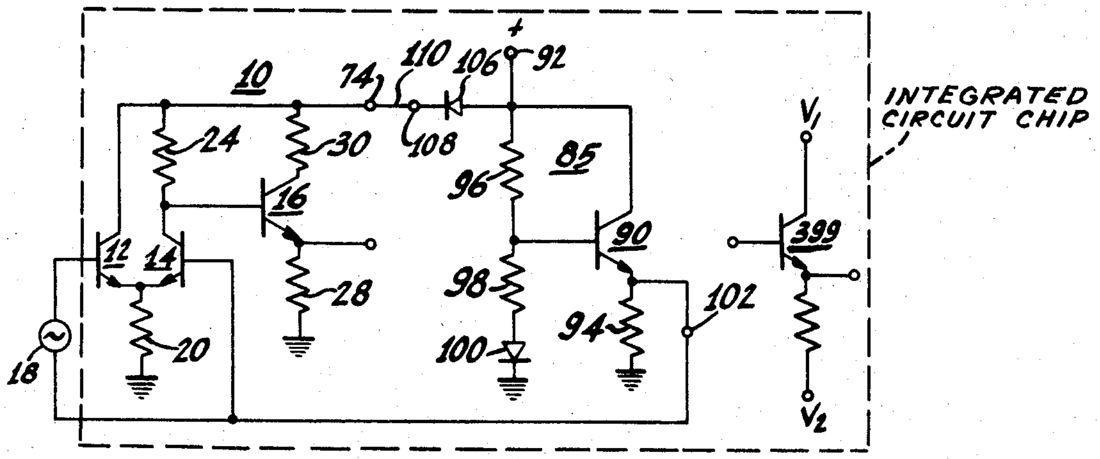
FIG. 5 is a schematic circuit diagram of the amplifier stage of FIG. 4 in combination with another operating supply.

Referring now to FIG. 5, there is shown a schematic circuit diagram of the amplifier stage 10 in combination with another operating potential supply 85. The supply 85 includes a transistor 90 arranged in a common collector type configuration, with its collector electrode directly connected to an energizing potential terminal 92 and with its emitter electrode connected to the reference or ground point through a resistor 94. A series circuit including resistors 96 and 98 and diode 100, in that order, is connected between terminal 92 and ground, with diode 100 having its cathode electrode at the ground point. The base electrode of transistor 90 is connected to the junction between resistors 96 and 98, while the emitter electrode of that transistor is connected via a terminal 102 and a lead 104 to the base electrode of transistor 14 in the amplifier stage 10. A second diode 106 is also included within the supply 85 and has its anode electrode connected to the terminal 92 and its cathode electrode connected via a terminal 108 and lead 110 the potential terminal 74 of the amplifier stage 10. It will be understood than in an actual construction of the combination of FIG. 5, terminals 74, 102 and 108 may not exist as precise contacts although they are shown as such for purposes of illustration. That is, in integrated circuit design where there exists a limited number of useable terminals around the periphery of a chip, these points may be internally connected instead of being brought out as terminals.

The operating potential supply 85, like the supply 65 of FIGS. 3 and 4, is capable of developing two direct voltages, one of which is substantially twice the value of the other. Assume resistors 96 and 98 to be of equal value. The direct voltage at the base electrode of transistor 90 is then equal to one-half the difference between the value of the energizing potential at the terminal 92 and the forward drop across diode 100, plus that forward voltage drop. The direct voltage at the emitter electrode of transistor 90 is then this voltage less the drop across the base-to-emitter junction of transistor 90, characteristically equal to that across the diode 100. The result is that the direct voltage at terminal 102 is equal to one-half the difference between the energizing potential at terminal 92 and the diode contact potential. The direct voltage at the terminal 108, on the other hand, is equal to the energizing potential at terminal 92 less the forward voltage drop across diode 106 or, simply the difference between the energizing and diode contact potentials. It will thus be noted that the direct voltage at terminal 108 is twice that at terminal 102. By way of example, if the potential at terminal 92 were 7.7 volts and the contact potential or drop across diodes 100 and 106 were 0.7 volts each, then the direct voltages at terminals 108 and 102 would be 7.0 and 3.5 volts, respectively. As was described above, the amplifier stage 10 shown connected to these terminals in FIG. 5 will symmetrically limit with this combination of voltages while the amplifier stage 11 (without the collector electrode resistor 30 in the emitter-follower circuit) will not.

The operating potential supply 85 also exhibits the desirable feature of developing a pair of voltages which maintain their fractional relationship even in the presence of temperature variations or potential variations at terminal 92. Consider, for example, a temperature variation. Any change in the voltage drop across the base-to-emitter junction of transistor 90 which results will be offset by a corresponding change in the contact potential of diode 100. With equal valued resistors 96 and 98 and a 7.7-volt energizing potential at terminal 92, and assuming a temperature variation to cause a change in $V_{be}$ voltage drop from 0.7 volts to 0.9 volts, it can be shown that 3.4 volts direct voltage will be developed at terminal 102. The direct voltage at terminal 108 will then be 6.8 volts, the 7.7 volts energizing potential less the contact potential of diode 106 (now 0.9 volts), or twice that at terminal 102.

Consider, on the other hand, a potential variation at terminal 92 from 7.7 volts to 7.9 volts and with the temperature constant. The direct voltage developed at terminal 108 will then be 7.2 volts while that at terminal 102 will be 3.6 volts. It will again be noted that the two-to-one relationship between the two direct voltages is maintained.

As was previously implied, voltage relationships other than two-to-one can be had with the operating supply 85 of FIG. 5 simply by choosing different resistance ratios for the resistors 96 and 98. With the value of resistor 96 twice that of resistor 98, for example, the direct voltage developed at terminal 108 will be three times the direct voltage developed at terminal 102. In general, it can be shown that the ratio of the direct voltage at terminal 108 to that at terminal 102 will follow the resistance ratio of the resistor 96 to resistor 98, plus one. It will also be appreciated that either or both diodes 100 and 106 in the supply 85 may be replaced by a transistor connected in an emitter-follower configuration without affecting the characteristics of the supply 85 as temperature and potential vary. This is because the $v_{be}$ voltage drop of the transistor substantially equals, and varies in the same manner, as the contact potential of the diode. Such a transistor configuration is shown along side FIG. 5, where it will be understood that the base electrode of the transistor 399 is connected to resistor 98 or 96 as the case may be and that the emitter electrode of transistor 399 is connected to ground or terminal 108, respectively.

Figure 6:
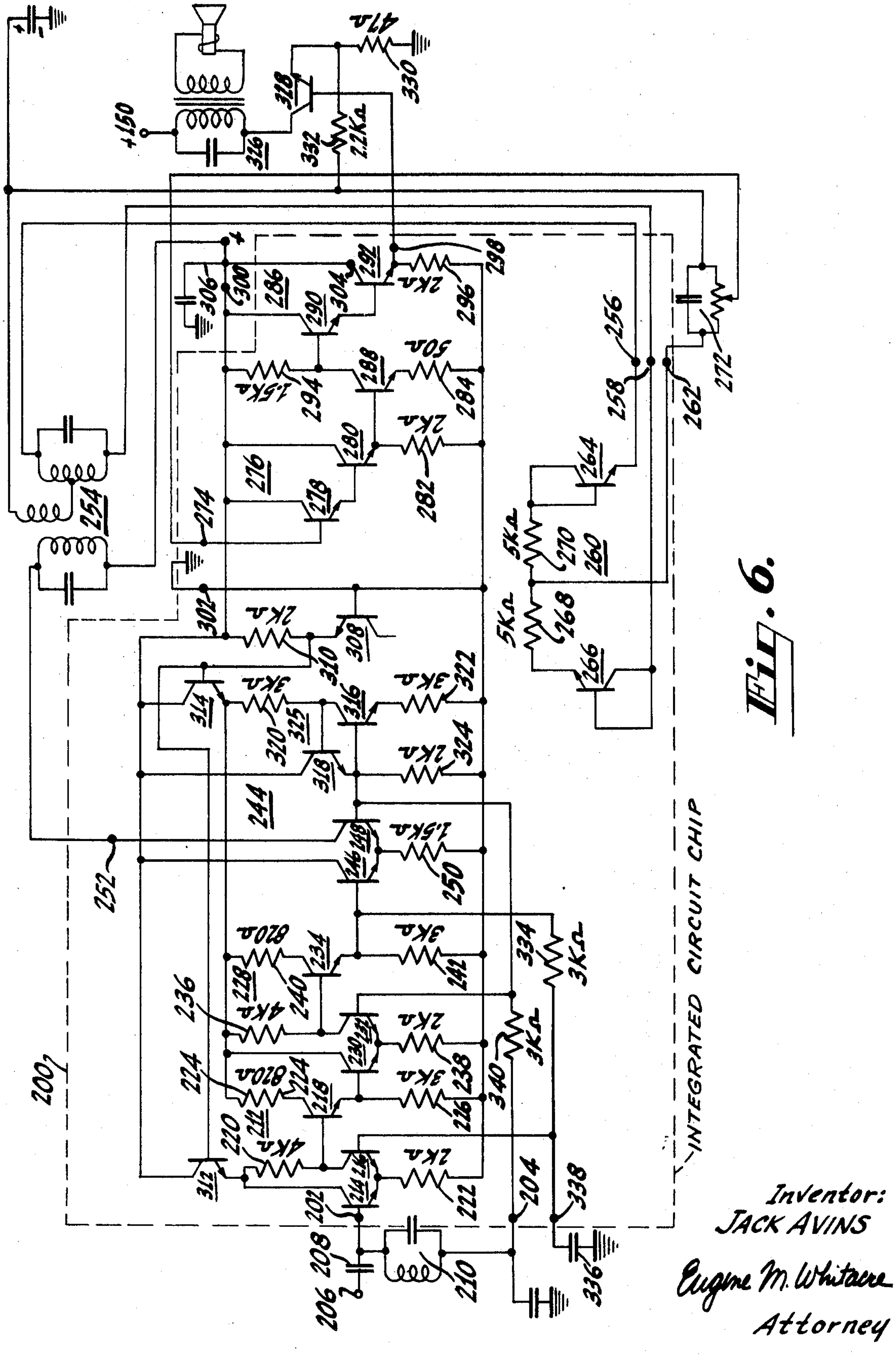
FIG. 6 is a schematic circuit diagram of an angle modulated wave processing channel for television receivers which may be incorporated in an integrated circuit device.

Referring now to FIG. 6, there is shown a schematic circuit diagram of an angle modulated wave processing channel for television receivers which may be incorporated in an integrated circuit device. The dotted box 200 schematically illustrates a monolithic semiconductor circuit chip for use in the sound channel of the receiver. The chip has a plurality of contact areas about the periphery thereof through which connections to the circuit on the chip may be made. For example, the chip 200 has a pair of contact areas 202 and 204 which are coupled to a source of frequency modulated (FM) waves. As to physical dimensions, the chip 200 may be of the order of 60 mils × 60 mils, or smaller.

FM signals from a suitable source, such as a video detector or a video amplifier of a television receiver, are applied between terminal 206 and ground, and are coupled through a capacitor 208 to a resonant circuit 210 which is tuned to the 4.5 Mc/s intercarrier beat between the video and sound carriers of a television signal. The resonant circuit 210 and the coupling capacitor 208, in the present example, are external to the chip but are coupled thereto through the contact areas 202 and 204.

The contact area 202 is directly coupled to a first amplifier stage 212 including three transistors 214, 216 and 218. The first two transistors 214 and 216 are connected by two-to-one ratio resistors 220 and 222 to provide an emitter coupled amplifier, and the third transistor 218 is connected by resistors 224 and 226 as an emitter follower. A described above with respect to FIG. 1, resistor 224 ensures symmetrical limiting of signals applied to the amplifier stage 212.

The amplifier stage 212 is directly coupled to a similar amplifier stage 228 which also includes three transistors 230, 232 and 234. The first two transistors 230 and 232 are also connected by two-to-one ratio resistors 236 and 238 to form the emitter coupled amplifier construction while the third transistor 234 is also connected as an emitter follower, by resistors 240 and 242. Resistor 240 again ensures symmetrical limiting by the stage 228.

Output signals from the amplifier stage 228 are developed across the resistor 242 and applied to a high level limiter stage 244 including transistors 246 and 248 and an emitter coupling resistor 250. The transistor 248 portion of the stage 244 is connected through a contact area 252 to drive the primary winding of a discriminator transformer 254. The secondary winding of the discriminator transformer is connected through a pair of contact areas 256 and 258 to the remainder of the discriminator circuit 260. The discriminator circuit 260 is balanced to provide a direct output voltage at a contact area 262 which does not vary with signal level or power supply fluctuations.

The discriminator circuit 260 is of the type described in my U.S. Pat. No. 3,383,607, entitled "FREQUENCY MODULATION DETECTOR CIRCUIT SUITABLE FOR INTEGRATION IN A MONOLITHIC SEMICONDUCTOR BODY" granted May 14, 1968. More particularly, the circuit 260 is of the form of a ratio detector but without the large non-integratable capacitor normally used to obtain peak rectification. The oppositely poled rectifier devices of the ratio detector are shown fabricated from transistors 264 and 266 while the distributed capacitance of the integrated load resistors 268 and 270 provide filtering of the signal frequency and its harmonics. As is described in U.S. Pat. No. 3,383,607, operating the detector into a substantially resistive load has the advantage of reducing the loading effect of the detector diode network on the secondary and primary windings of the discriminator transformer 254. In conventional FM discriminator circuits, a ±20 percent variation in the load resistors substantially alters the peak-to-peak separation and linearity of the detector. However, the loading reflected by the diffused load resistors 268 and 270 in the circuit 260 can be reduced to so low a level that it plays a negligible role in determining the discriminator characteristics.

The demodulated signals developed by the discriminator 260 are applied by means of a volume control circuit 272 and a contact area 274 to an audio frequency amplifier stage 276 including transistors 278 and 280 and resistor 282. The amplified signals from the stage 276 are direct coupled to a driver stage 286, which includes transistors 288, 290 and 292 and resistors 284, 294 and 296. Output signals from the stage 286 are developed across resistor 296 and taken from the semiconductor chip through a contact area 298.

The circuit of FIG. 6 is similar to that of FIGS. 2–5 in that the operating potential supply is unbalanced. In other words, all of the voltages in the circuit are positive relative to ground. To this end, the positive terminal of a direct current supply source (which may be subject to some variation) is connected to the contact area 300, and the grounded negative terminal is connected to the contact area 302. The unregulated voltage between the contact areas 300 and 302 is directly applied to the transistor 246 of the high level limiter stage 244.

The supply voltage variation is regulated by the emitter-base breakdown voltage of a transistor 308, which is connected to the contact area 300 via a resistor 310 and whose collector electrode is left unconnected. Transistors 312 and 314, connected to the contact 300 and to the transistor 308, serves as emitter followers to isolate the regulated voltage fed to the amplifier stages 212 and 228 as collector supply voltages.

A contact area 304 in the driver stage 286 is shown directly connected to the contact area 300 via an external lead 306 so that the stage 286 can be used to drive a single ended output stage 326 from the contact 298. The stage 326 includes an output transistor 328 and a pair of resistors 330 and 332 which provide a return path to ground for the tertiary winding of the discriminator transformer 254. Alternatively, contact area 304 can be impedance coupled to the contact area 300 and suitable drive for a class B output stage can then be taken from the contact 304.

A pair of transistors 316 and 318 and three resistors 320, 322 and 324 are also included in the circuit of FIG. 6, and comprise a bias potential supply 325 for the amplifier stages 212, 228 and 244. This supply 325 is similar to the operating potential supply 65 of FIG. 3 in that it develops a voltage across resistor 324 which is substantially equal to one-half the value of the supply voltage at the end of resistor 320 remote from the collector electrode of transistor 316 and which is independent of temperature and supply voltage variations. Operating point stability of the amplifier stages 212 and 228 is maintained by use of direct current feedback through resistor 334 around those two stages, with a bypass capacitor 336 connected to the resistor 334 via a contact area 338. The limiter stage 244 is then held automatically at the proper operating point because the feedback around the amplifier stages 212 and 228 holds the voltage at the base electrode of the stage 244 at one-half the aforementioned supply voltage. The limiter stage 244 is thus balanced without being in the feedback loop. This is desirable because the tendency toward oscillation within the feedback loop is reduced by keeping the number of stages as low as possible. Proper bias voltage for the limiter stage 244 is made essentially independent of transistor current gain through the use of a resistor 340, connected in the base electrode return of transistor 214 and equal in value to the resistor 344 connected in the base electrode return of transistor 216.

The absence of coupling capacitors between the various amplifier stages on the semiconductor chip in FIG. 6 provides advantages both to the topology of the resultant integrated circuit, and in the integrated circuit performance. Coupling capacitors, as previously described, take up a large area on the integrated circuit. In addition, these capacitors add parasitic capacitance which reduces the bandwidth of the circuit.

I claim:

1. A signal limiting circuit comprising:
first and second transistors, each having base, emitter and collector electrodes;
means including a first resistor connected to the collector electrode of said first transistor for connecting said first transistor as a signal translating circuit, and for establishing a first quiescent voltage at the collector electrode of said first transistor;
means for applying signals to be translated between the emitter and base electrodes of said first transistor and for establishing a second quiescent voltage at the emitter electrode of said first transistor, said second quiescent voltage determining a minimum output signal voltage at the collector electrode of said first transistor upon the occurrence of saturation conduction of said first transistor in response to input signal changes of one sense;
means direct current coupling signals from the collector electrode of said first transistor to the base electrode of said second transistor; and
means including a second resistor connected to the collector electrode and a third resistor connected to the emitter electrode of said second transistor for causing the collector-to-base junction of said second transistor to become forward biased and thereby produce saturation conduction of said second transistor when the voltage at the collector electrode of said first transistor increases from its quiescent value by an amount substantially equal to the difference between said first and said second quiescent voltages for input signal changes of opposite sense to provide substantially symmetrical limiting upon the occurrence of saturation of said first and second transistors.

2. A signal limiting circuit as defined in claim 1 wherein the values of said first and second resistors are such as to establish a voltage between the collector and base electrodes of said first transistor which is substantially equal to an integral multiple, including one, of the voltage between the base and emitter electrodes of said second transistor, for maintaining said output terminal at substantially the same direct voltage as at the base electrode of said first transistor.

3. A signal translating circuit comprising;
first, second and third transistors, each having base, emitter and collector electrodes;
means including first and second resistors connecting said first and second transistors as an emitter coupled amplifier circuit, said first resistor connected in common with the emitter electrodes of said first and second transistors, and said second resistor connected in the collector electrode circuit of said second transistor, said second resistor and said collector electrode of said first transistor being adapted for connection to a source of operating voltage;
signal input circuit means connected to the base electrode of said first transistor;
means including third and fourth resistors connecting said third transistor as an emitter follower circuit, said third resistor connected in the collector electrode circuit of said third transistor and said fourth resistor connected in the emitter electrode circuit of said third transistor;
direct current signal coupling means between the collector electrode of said second transistor and the base electrode of said third transistor for maintaining the direct voltage at the base electrode of said third transistor substantially equal to the direct voltage at the collector electrode of said second transistor; and
means coupled to said base electrode of said second transistor for biasing said second transistor to establish a first quiescent voltage at its collector electrode which reverse biases the collector-base junction thereof by an amount substantially equal to the forward base-to-emitter voltage of said third transistor and a second quiescent voltage at its emitter electrode, such that said third transistor is driven into saturation when, in response to input signals of one sense, the voltage at the collector electrode of said second transistor increases from its quiescent value by an amount substantially equal to the difference between said first and said second quiescent voltages and said second transistor is driven into saturation when, in response to input signals of opposite sense, the voltage at the collector electrode of said second transistor decreases substantially to said second quiescent voltage to provide substantially symmetrical limiting.

4. A signal translating circuit comprising;
first, second and third transistors, each having base, emitter and collector electrodes;
first and second terminals adapted to be connected to an operating potential supply source, and a third terminal adapted to be maintained at a potential substantially one-half the potential between said first and second terminals;
signal input circuit means connected to the base electrode of said first transistor;
a first resistor connected between the emitter electrodes of said first and second transistors and said first terminal;
a second resistor having a resistance value twice as large as the resistance value of said first resistor connected between the collector electrode of said second transistor and said second terminal;
a direct current connection from the collector electrode of said first transistor to said second terminal;
means connecting the base electrode of said second transistor to said third terminal;
a direct current connection from the collector electrode of said second transistor to the base electrode of said third transistor;
a third resistor connected between the collector electrode of said third transistor and said second terminal;
a fourth resistor connected between the emitter electrode of said third transistor and said first terminal; and
said third and fourth resistors being proportioned so that the quiescent no signal voltage at the emitter electrode of said third transistor is substantially equal to the voltage at said third terminal and so that the collector to base junction of said third transistor becomes forward biased and said third transistor is driven to saturation conduction when the voltage at the collector electrode of said second transistor increases from its quiescent no signal value by an amount substantially equal to the difference between said collector quiescent voltage and the quiescent no signal voltage at the emitter electrode of said second transistor in response to input signals of one sense, and so that said second transistor is driven to saturation in response to input signals of opposite sense sufficient to decrease the voltage at the emitter electrode of said third transistor from its quiescent value by an amount equal to said difference to provide substantially symmetrical limiting.

5. A signal translating circuit comprising:

a first amplifier stage including first, second and third transistors, each having base, emitter and collector electrodes;

means including first and second resistors connecting said first and second transistors an an emitter coupled amplifier circuit, said first resistor connected in common with the emitter electrodes of said first and second transistors and said second resistor connected in the collector electrode circuit of said second transistor, said second resistor having twice the resistance value of said first resistor, the collector electrode of said first transistor being adapted for connection to a source of operating potential;

signal input circuit means connected to the base electrode of said first transistor;

biasing means coupled between the base and emitter electrodes of said first and second transistors;

means including third and fourth resistors connecting said third transistor as an emitter follower circuit, said third resistor connected in the collector electrode circuit of said third transistor and said fourth resistor connected in the emitter electrode circuit of said third transistor;

a direct current connection between the collector electrode circuit of said second transistor and the base electrode of said third transistor for applying signals from said emitter coupled amplifier circuit to said emitter follower circuit;

a second amplifier stage including fourth, fifth and sixth transistors, each having base, emitter and collector electrodes;

means including fifth and sixth resistors connecting said fourth and fifth transistors as an emitter coupled amplifier circuit, said fifth resistor connected in common with the emitter electrodes of said fourth and fifth transistors and said sixth resistor connected in the collector electrode circuit of said fifth transistor, said sixth resistor having twice the resistance value of said fifth resistor, the collector electrode of said fourth transistor being adapted for connection to said source of operating potential;

means connecting the base electrode of said fourth transistor to the emitter electrode of said third transistor;

biasing means coupled between the base and emitter electrodes of said fourth and fifth transistors;

means including seventh and eighth resistors connecting said sixth transistor as an emitter follower circuit, said seventh resistor connected in the collector electrode circuit of said sixth transistor and said eighth resistor connected in the emitter electrode circuit of said sixth transistor; and a direct current connection for applying signals developed across said sixth resistor to the base electrode of said sixth transistor;

said biasing means and said third, fourth, seventh and eighth resistors being proportioned so that the quiescent no signal voltages at the emitter electrodes of said third and sixth transistors are substantially equal to each other and to the quiescent input voltage supplied to said first and fourth transistors, and so that the collector to base junction of each of said third and sixth transistors becomes forward biased and said third and sixth transistors are driven to saturation conduction when the voltage at the collector electrodes of said second and fifth transistors, respectively, increase from quiescent value by an amount substantially equal to the difference between said collector quiescent voltage and the quiescent voltage at the emitter electrodes of said second and fifth transistors in response to input signals of one sense, and so that said second and fifth transistors are driven to saturation in response to signals of opposite sense sufficient to decrease the voltage at the emitter electrodes of said third and sixth transistors, respectively, from their quiescent value by an amount equal to said difference to provide substantially symmetrical limiting.

6. A signal translating circuit as defined in claim 5, wherein there is also included a third amplifier stage having seventh and eighth transistors, each with base, emitter and collector electrodes, the collector electrodes of said seventh and eighth transistors being adapted for connection to a source of operating potential, and a ninth resistor connected in common with the emitter electrodes of said seventh and eighth transistors for connecting said seventh and eighth transistors as an emitter-coupled amplifier circuit, and wherein there is further included signal input circuit means connecting the base electrode of said seventh transistor to the emitter electrode of said sixth transistor.

7. A signal translating circuit as defined in claim 6 wherein there is also included a direct current feedback circuit connected between the emitter electrode of said sixth transistor and the base electrode of said second transistor.

8. A signal translating circuit as defined in claim 7 wherein the direct operating voltage applied to said seventh and eighth transistors is of a greater magnitude than the operating voltage applied to said first, second, third, fourth, fifth and sixth transistors.

9. A signal translating circuit as defined in claim 12, wherein the bias voltage applied to said first, second, third, fourth, fifth and sixth transistors is provided by a potential source comprising:

ninth and tenth transistors, each having base, emitter and collector electrodes;

means including tenth and eleventh resistors connecting said ninth transistor in a degenerated common-emitter circuit, said tenth resistor connected in the collector electrode of said ninth transistor and said eleventh resistor connected in the emitter electrode circuit of said ninth transistor, said tenth resistor having substantially the same resistance value as said eleventh resistor;

means for connecting said tenth transistor as an emitter-follower circuit, said means including a twelfth resistor connected in the emitter electrode circuit of said tenth transistor, the collector electrode of said tenth transistor being adapted for connection to a source of operating potential;

a direct current connection between the collector electrode of said ninth transistor and the base electrode of said tenth transistor;

a direct current connection between the collector electrode of said ninth transistor and the base electrode of said tenth transistor;

a direct current connection between the base electrode of said ninth transistor and the emitter electrode of said tenth transistor; and means coupled to said tenth transistor for developing said operating voltage across said twelfth resistor.

10. A signal translating circuit comprising:

first, second, third, fourth and fifth transistors, each having base, emitter and collector electrodes;

first and second terminals adapted to be connected to a source of energizing potential;

signal input circuit means connected to the base electrode of said first transistor;

a first resistor connected between the emitter electrodes of said first and second transistors and said first terminal;

a second resistor having a resistance value twice as large as the resistance value of said first resistor connected between the collector electrode of said second transistor and said second terminal;

a direct current connection from the collector electrode of said first transistor to said second terminal;

a direct current connection from the collector electrode of said second transistor to the base electrode of said third transistor;

a third resistor connected between the collector electrode of said third transistor and said second terminal;

a fourth resistor connected between the emitter electrode of said third transistor and said first terminal;

a fifth resistor connected between the collector electrode of said fourth transistor and said second terminal;

a sixth resistor having a resistance value substantially equal to the resistance value of said fifth resistor connected between the emitter electrode of said fourth transistor and said first terminal;

a direct current connection from the base electrode of said fourth transistor to the base electrode of said second transistor;

a direct current connection from the collector electrode of said fifth transistor to said second terminal;

a seventh resistor connected between the emitter electrode of said fifth transistor and said first terminal;

a direct current connection from the emitter electrode of said fifth transistor to the base electrode of said fourth transistor; and a direct current connection from the collector electrode of said fourth transistor to the base electrode of said fifth transistor.

11. A signal translating circuit comprising:

first, second, third and fourth transistors, each having base, emitter and collector electrodes;

first and second terminals adapted to be connected to a source of energizing potential;

a first rectifier device having an anode electrode connected to said second terminal and a cathode electrode;

signal input circuit means connected to the base electrode of said first transistor;

a first resistor connected between the emitter electrodes of said first and second transistors and said first terminal;

a second resistor having a resistance value twice as large as the resistance value of said first resistor connected between the collector electrode of said second transistor and the cathode electrode of said first rectifier device;

a direct current connection from the collector electrode of said first transistor to the cathode electrode of said first rectifier device;

a direct current connection from the collector electrode of said second transistor to the base electrode of said third transistor;

a third resistor connected between the collector electrode of said third transistor and the cathode electrode of said first rectifier device;

a fourth resistor connected between the emitter electrode of said third transistor and said first terminal;

fifth and sixth resistors of substantially equal resistance value and a second rectifier device having anode and cathode electrodes serially connected between said first and second terminals, with the anode electrode of said second rectifier device connected to the end of said sixth resistor remote from said fifth resistor and with the cathode electrode of said second rectifier device connected to said first terminal;

a direct current connection from the collector electrode of said fourth transistor to said second terminal;

a seventh resistor connected between the emitter electrode of said fourth transistor to said first terminal;

a direct current connection from the emitter electrode of said fourth transistor to the base electrode of said second transistor; and a direct current connection from the junction of said fifth and sixth resistors to the base electrode of said fourth transistor.

UNITED STATES PATENT OFFICE

CERTIFICATE OF CORRECTION

Patent No. 3,569,740 Dated March 9, 1971

Inventor(s) Jack Avins

It is certified that error appears in the above-identified patent and that said Letters Patent are hereby corrected as shown below:

Column 1, line 51, that portion reading "provided" should read --provides--; line 59, after "on" insert --an application--. Column 5, line 54, after "5.6" insert --volt--. Column 11, line 21, delete "an" (first occurre and substitute --as--. Column 12, line 36, that portion reading "12" should read --8--; delete lines 59-61. Column 14, line 32, that portion reading "to" should read --and--.

Signed and sealed this 20th day of July 1971.

(SEAL)
Attest:

EDWARD M.FLETCHER,JR.
Attesting Officer

WILLIAM E. SCHUYLER, JR.
Commissioner of Patents